United States Patent
Yin et al.

(12)

(10) Patent No.: US 6,246,707 B1
(45) Date of Patent: Jun. 12, 2001

(54) HIGH REPETITION RATE PULSED LASER

(75) Inventors: Yusong Yin, Stony Brook; Dmitry Donskoy, Oceanside, both of NY (US)

(73) Assignee: Photonics Industries International, Inc., Bohemia, NY (US)

( * ) Notice: Subject to any disclaimer, the term of this patent is extended or adjusted under 35 U.S.C. 154(b) by 0 days.

(21) Appl. No.: 09/195,477

(22) Filed: Nov. 18, 1998

(51) Int. Cl.⁷ .................................................. H01S 3/10
(52) U.S. Cl. ............................ 372/25; 372/98; 372/102; 372/22; 372/20
(58) Field of Search ......................... 372/25, 102, 98, 372/92, 22, 20

(56) References Cited

U.S. PATENT DOCUMENTS

| | | | |
|---|---|---|---|
| 4,327,337 | * | 4/1982 | Liu ........................................... 37/21 |
| 5,121,398 | * | 6/1992 | Rao ........................................ 372/20 |
| 5,438,416 | * | 8/1995 | Nater ..................................... 372/38 |

* cited by examiner

Primary Examiner—Leon Scott, Jr.
(74) Attorney, Agent, or Firm—James A. Quinton, Esq.

(57) ABSTRACT

A pulsed laser preferably a tunable laser having a narrow band width is provided which has a high conversion efficiency at a high repetition rate. The laser includes a diffraction grating located in the laser's optical cavity. The optical cavity is defined by a mirror and diffraction grating or two mirrors with a diffraction grating therebetween. A tunable laser material is located within the optical cavity between the mirror and the diffraction grating. Desirably the diffraction grating is movably mounted within the optical cavity so that a beam of a presected wave length diffracted by the grating can be directed across the laser material. Optionally where two mirrors define the optical cavity, one of the mirrors or the grating or both can be movably mounted within the optical cavity. Preferable the movable grating and the movable mirror are rotatably mounted.

53 Claims, 5 Drawing Sheets

HIGH REPETITION RATE PULSED LASER

FIELD OF THE INVENTION

The field of the invention concerns a pulsed solid state laser. In particular the invention relates to a method and apparatus for generating a pulsed solid state laser having a high conversion efficiency at a high repetition rate and narrow band width.

BACKGROUND OF THE INVENTION

Solid state laser operation at a high repetition rate is desired for many applications. However, obtaining sufficient power conversion and a narrow band width has been problematic in the past. Especially desirable is a solid state tunable laser which can be operated at a high repetition rate of 700 pulses per second or greater.

Prior art tunable lasers are known. For example, a Ti:Sapphire (Ti:Sapphire) laser having a repetition rate of 10 pulses per second is known in the art. See U.S. Pat. No. 5,121,398 (RAO). 3x beam expanders and a diffraction grating have been used in these types of devices.

However, there is still a need for pulsed lasers which can be operated at much higher repetition rates and having a narrow band width and a high power output.

SUMMARY OF THE INVENTION

According to the invention a pulsed solid state laser preferably a tunable laser having a narrow band width is provided which has a high conversion efficiency at a high repetition rate. In a further aspect of the invention, the solid state laser according to the invention has a high conversion efficiency at a high pump power. Preferably the laser according to the invention is at a pump power of 4 to 25 watts or more. In another aspect of the invention a method of operating a pulsed laser at a high repetition rate and narrow band width and preferably at a high pump power is provided. According to the invention, a diffraction grating is located in the laser's optical cavity. The optical cavity is defined by a mirror and diffraction grating or two mirrors with a diffraction grating therebetween. A laser material is located within the optical cavity between a mirror and the diffraction grating. Desirably the diffraction grating is movably mounted within the optical cavity so that a beam of a presected wavelength diffracted by the grating can be directed across the laser material along the optical axis. Optionally where two mirrors define the optical cavity, one or both of the mirrors and optionally the grating can be movably mounted within the optical cavity. Preferable the movable grating and the movable mirror are rotatably mounted.

A solid state laser material is located in the optical cavity preferably a laser material which lases over a range of tunable wavelength is used. A beam expander such as one or more prisms or one or more lenses is provided between the laser material and the diffraction grating. The beam expander increases the cross sectional area of the beam propagating from the laser material prior to its incidenting on the diffraction grating. A pulsed pump laser is provided to excite the laser material in the optical cavity. The pump laser pulses at a rate of about 700 pulses per second (PPS) or more and desirably at about 700 to about 10,000 PPS or greater. Desirably the laser is pumped by the pump laser at a high pump power. Pump power is 4 to 25 watts or higher and preferably 10 watts or greater.

In operation the energy from the pulsed pump laser is directed across the laser material to excite the laser material. The beam from the laser material is directed to a beam expander where the cross sectional area of the beam is expanded at least about 6 times preferably about 6 to about 60 times and desirably 10 times to 60 times or more optionally to about 10 times to about 40 times and desirably at least about 10 times. The expanded beam is then directed to a diffraction grating where the beam is diffracted into multiple beams of differing wavelength. The band widths of the diffracted beam are preselected at a desirable narrow range preferably 0.005 to 0.2 $cm^{-1}$ band width desirably 0.01 to 0.1 $cm^{-1}$. A portion of the resulting preselected wavelength beam is removed from the cavity as the laser output.

It is an object of the invention to provide an efficient pulsed solid state laser having a narrow band width beam which is operable at a high repetition rate.

It is an other object of the invention to provide a pulsed solid state laser operable at a high repetition rate having an improved conversion efficiency and high average power output.

It is a further object of the invention to provide a pulsed solid state laser operable at a high repetition rate.

It is a further object of the invention to provide a tunable pulsed solid state laser that is operable at a high repetition rate and has a high conversion efficiency and high average power output.

It is a further object of the invention to provide a tunable pulsed laser that is operable at a high pump power and high conversion efficiency.

It is a further object of the invention to provide a method for operating a tunable pulsed laser at a high repetition rate and high pump power to provide a narrow band width pulse of a preselected frequency while achieving a high conversion efficiency.

Other and further objects will become apparent from the specifications, drawings and claims.

The preferred embodiment of the present invention is illustrated in the drawings and examples. However, it should be expressly, understood that the present invention should not be limited solely to the illustrative embodiment.

DETAILED DESCRIPTION OF THE INVENTION

According to the invention a pulsed solid state laser preferably a tunable laser having a narrow band width is provided which has a high conversion efficiency at a high repetition rate. In another aspect of the invention a method of operating a pulsed laser at a high repetition rate and narrow band width is provided.

According to the invention, a diffraction grating is located in the laser's optical cavity. The optical cavity is defined by a mirror and diffraction grating or two mirrors with a diffraction grating therebetween. A laser material is located within the optical cavity between a mirror and the diffraction grating. Desirably the diffraction grating is movably mounted within the optical cavity so that a beam of a presected wavelength diffracted by the grating can be directed across the laser material. Optionally where two mirrors define the optical cavity, one of the mirrors or the grating or both can be movably mounted within the optical cavity. Preferably the movable grating and the movable mirror are rotatably mounted.

The laser material located in the optical cavity is preferably a solid state laser material which lases over a range of tunable wavelengths. A beam expander such as one or more prisms or one or more lenses is provided within the cavity between the laser material and the diffraction grating. The beam expander increases the cross sectional areas of the beam propagating from the laser material prior to its incidenting on the diffraction grating. A pulsed pump laser is provided to excite the laser material in the optical cavity. The pump laser pulses at a rate of about 700 pulses per second (PPS) or more and desirably at about 1,000 to about 10,000 PPS. The pump laser pumps at a high pump power preferably at about 4 to about 25 watts or higher. Desirably the pump laser operates at about 10 watts or higher. The resulting laser has a high power output and desirably delivers about 300 mW and higher preferably about 500 mW or more and optionally 1 w or more.

Figure 1:
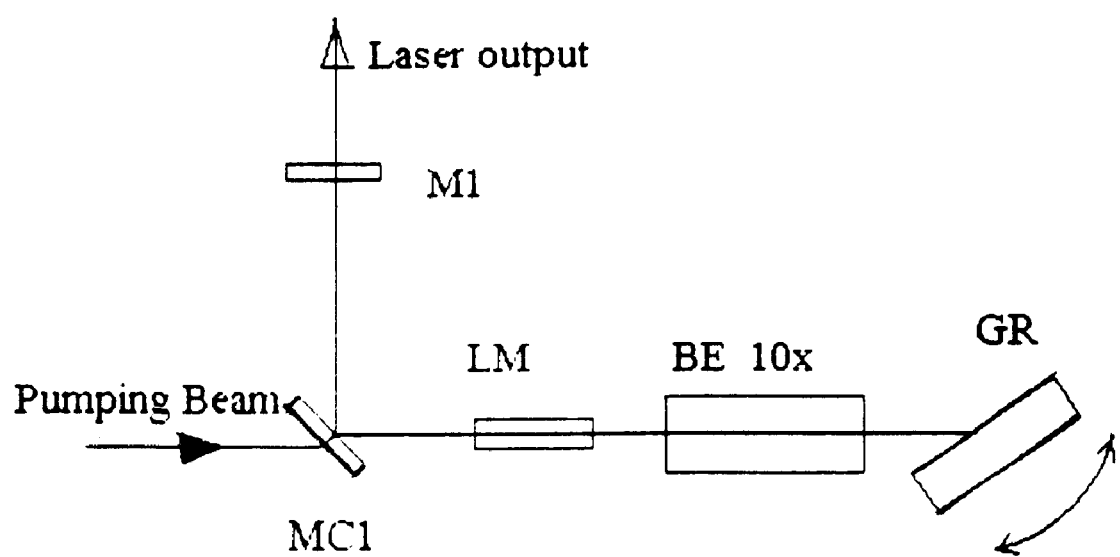
FIG. 1 is a diagrammatic view of a laser according to the invention.
Figure 2:
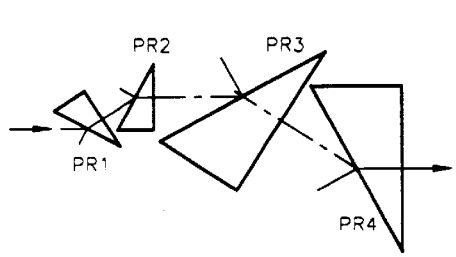
FIG. 2(a) is a diagrammatic view of a beam expander according to the invention.
FIG. 2(b) is a diagrammatic view of an alternative embodiment of the beam expander according to the invention.
Figure 2:
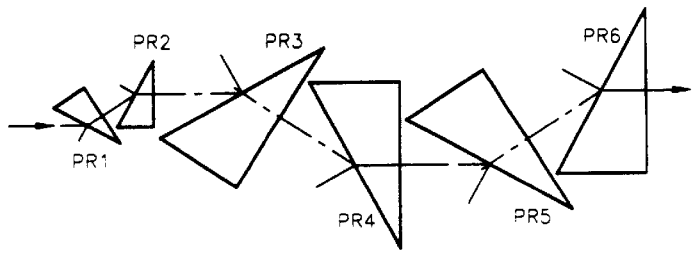
Figure 3:
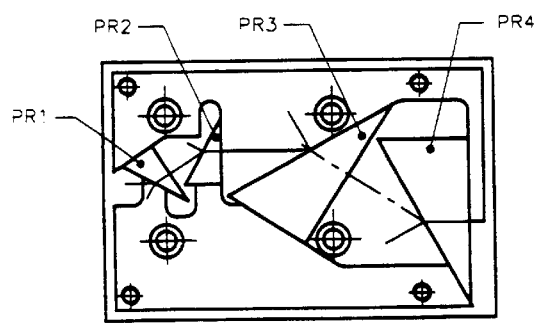
FIG. 3 is an assembly drawing of the beam expander of FIG. 2(a).

As best seen in FIG. 1 a pulsed solid state laser according to the invention is provided. An optical cavity is formed between a reflecting mirror M1 and diffraction grating GR. A solid state laser material LM, preferably a tunable laser material such as Ti:Sapphire is provided within the laser cavity. A beam expander BE is provided wherein the cross sectional area of the laser beam propagating from the laser material LM is expanded six times or more, preferably 6 to 60 times and desirably 10 to 60 times and particularly 10 times or more for example 10 to 40 times. The beam expander can be a lens or series or lenses. Preferable a prism beam expander is used which will expand the beam in a single direction. For example a YAG prism with an index of refraction of about 1.82 is provided. Desirably as shown in FIG. 2(a) and FIG. 3 a series of four (4) YAG prisms with an index of refraction of about 1.82 and having a Brewster cut on one side and a normal cut on the other side and which will give a beam expansion of about 11 times is provided. As best seen in FIG. 2(a), the laser beam is passed through PR1 at Brewster angle incident and exits at normal incident. The resulting beam then passes through Prisms PR2, PR3 and PR4 at Brewster incident angle. The beam exits each prism at normal incident. The normal incident side of each prism is antireflection coated for the laser wavelength. The resulting exiting expanded beam is then directed to grating GR as show on in FIG. 1. Optionally, as shown in FIG. 2(b) a series of six (6) YAG prisms with an index of refraction of about 1.82 and having a Brewster cut on one side and a normal cut on the other side and which will give a beam expansion of about 36 times is provided. As best seen in FIG. 2(b), the laser beam is passed through PR1 at Brewster angle incident and exits at normal incident. The resulting beam then passes through Prisms PR2, PR3, PR4, PR5 and PR6 at Brewster incident angle. The beam exits each prism at normal incident. The normal incident side of each prism is antireflection coated for the laser wavelength. The resulting exiting expanded beam is then directed to grating GR as shown on in FIG. 1.

The expanded beam is then directed to a diffraction grating GR in which the beam is diffracted into a series of preselected beams of narrow band width. Preferably a preselected narrow wavelength beam is selected and directed from the grating back through the laser material IM. The grating GR is preferably movably mounted desirably rotatably mounted within the optical cavity so that its reflection angle can be adjusted. Hence different wavelength beams can be directed from the grating to the laser material. A diffraction grating defracts the beam from the laser material into a series of beams of different wavelengths with narrow band width. By rotating the grating the desired defracted wavelength beam can be directed across the laser material. Diffraction gratings are available in the industry and for example are supplied by the Spectragon AB located in TABY Sweden.

As shown in FIG. 1, an optical cavity is formed between mirror M1 and grating GR. Desirably a dichroic mirror MC1 which reflects the laser wavelength beam and transmits the pump beam is provided in optical communication with a mirror preferably output coupler M1 and laser material LM. A pulsed pump laser LP which is preferably located outside the optical cavity is provided. Desirably the pump laser is an Nd:YLF, Nd:YAG or Nd:YVO$_4$ preferably a second harmonic pumping laser, preferably Q-switched with a pulsed capacity of 0 to 50,000 pulses per second (PPS). In operation the pump laser LP is set to pulse at a pulse rate of about 700 pulses per second (PPS) or more and desirably at about 700 to about 50,000 pulses per second and most desirably at about 1,000 to about 10,000 pulses per second (PPS), for example at 1,000 pulses per second (PPS) or more. The laser according to the invention is pumped at a high repetition rate and desirably at a high pump energy for example from about 0.5 mj to about 25 mj preferably at about 1 mj to about 15 mj. Desirably the laser is pumped at a high pump power. Pump power is calculated by multiplying the pump pulse energy times the repetition rate. According to the invention the laser is desirably pumped at a pump power of about 4 watts or more preferably about 4 to about 25 watts or more preferably 10 watts or more. Desirably a pump power of 7 to 15 watts is used. A resulting high conversion efficiency is achieved according to the invention.

The energy from the pumping laser LP is directed across laser material LM to excite the laser material. The beam propagating across laser material LM is directed to a beam expander BE where the cross sectional area is expanded 6 times or greater preferably 10 times or greater and desirably 10 to 60 times or more. This expanded beam is then directed to a diffraction grating GR which diffracts the beam propagating from LM into a series of narrow band width beams of differing wavelength. One of the defracted beams having a preselected wavelength and a narrow band width for example 800 nm wavelength and a band width of about 0.03 to 0.06 cm$^{-1}$ is directed back across the laser material LM. Optionally other wavelengths can be selected. The wavelength of the beam directed back across the lasing material is within the tunable range of the laser material LM. The beam propagating from LM is then directed to output coupler M1 by mirror MC1. A portion of the beam is transmitted through M1 outside the cavity as the laser output.

Figure 4:
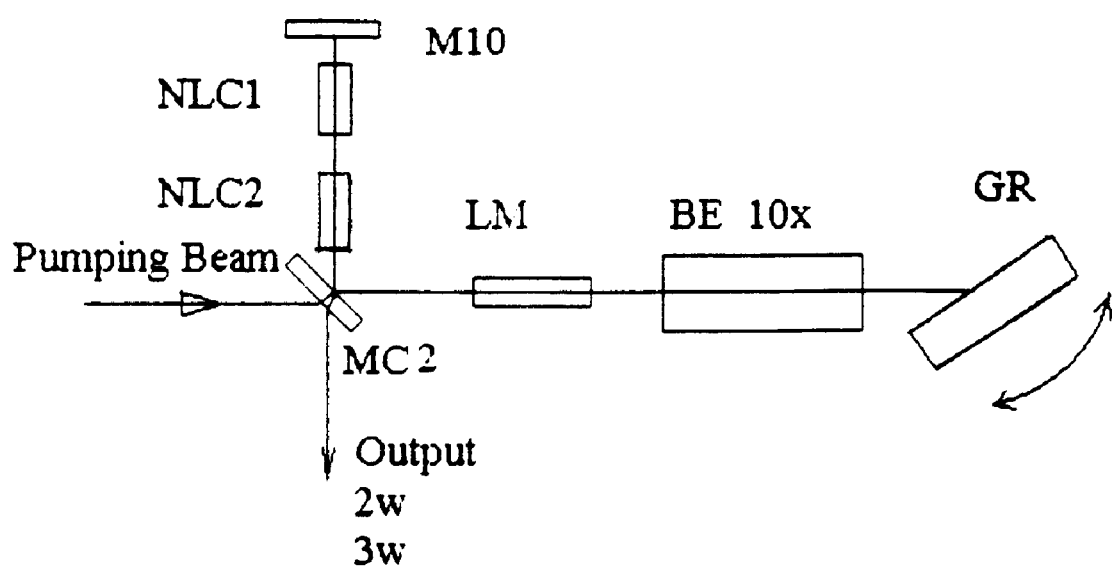
FIG. 4 is a diagrammatic view of an alternative embodiment of the laser according to the invention.

In another aspect of the invention as best seen with reference to FIG. 4, a second harmonic generator preferably second harmonic generation crystal NLC1 is provided between mirror M10 and dichroic mirror MC2. For example a Type I LBO or BBO crystal are used. Optionally a third harmonic generator, preferably third harmonic generation crystal NLC2 is provided between NLC1 and MC2.

In operation the fundamental beam is reflected by dichroic mirror MC2 which is reflective to the fundamental beam and transmissive to a second harmonic beam and optionally a third harmonic beam. The reflected fundamental pulse is directed across second harmonic generator NLC1 where a portion of the fundamental beam is converted to a second harmonic beam. In the second harmonic embodiment, the fundamental and second harmonic beams are reflected by mirror M10 back across NLC1 where a portion of the fundamental beam is again converted to second harmonic. The resulting pulsed second harmonic beam output is then transmitted through MC2 outside the laser cavity. Optionally, a third harmonic generator (i.e. third harmonic generation nonlinear crystal) NLC2 is provided. For example type I or preferably a type II nonlinear crystal which converts a fundamental beam to a third harmonic beam in the presence of a second harmonic beam eg. a type II LBO or BBO third harmonic generation crystal. In the third harmonic embodiment, the fundamental beam passes through NLC2 crystal where it is unaffected unless a second harmonic beam is present. The beam then passes through NLC1 where it is partially converted to a second harmonic beam. The fundamental and second harmonic beams are reflected by M10 back through NLC1 where a further portion of the fundamental beam is converted to second harmonic. The fundamental and second harmonic beams are then directed across crystal NLC2 where a third harmonic beam is formed when a fundamental and second harmonic beams are present. The resulting pulsed third harmonic beam is then directed outside of the cavity through MC2 which transmits the third harmonic wavelength beam. Desirably the second harmonic generator includes a type I frequency doubling nonlinear crystal eg. a LBO type I crystal. A type I or type II, preferably a type II frequency tripling nonlinear crystal can be also provided within the cavity. According to the invention other second and third harmonic generators can be used.

Figure 5:
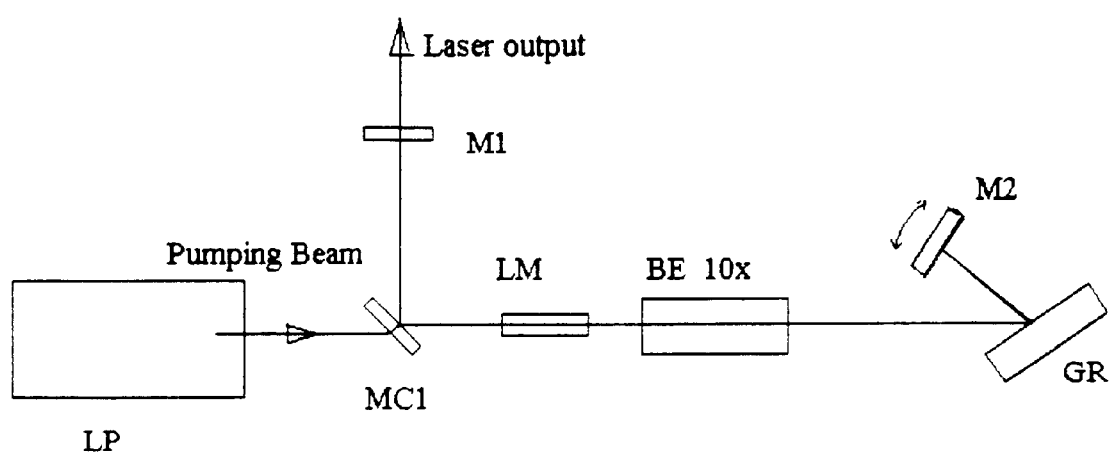
FIG. 5 is a diagrammatic view of an alternative embodiment of the laser according to the invention.

As best seen in FIG. 5, in another aspect of the invention, an optical cavity is formed between reflecting surfaces desirably output coupler M1 and reflecting mirror M2. A diffraction grating GR is located within the cavity and is in optical communication with mirrors M2 and M1. Preferably mirror M2 is rotatably mounted so a selected defracted beam can be reflected back to grating GR. According to the invention, a pump laser LP which is operated at a pulsing rate of 700 to 50,000 pulses per second (PPS), energizes a solid state laser material LM such as Ti:Sapphire crystal. A beam expander BE is located between laser material LM and grating GR. The beam expander is preferably the same as described with regard to FIG. 2 and FIG. 3. The lasing material LM lases upon its excitement by pumping laser LP at a preselected fundamental wavelength. The beam then is diffracted by grating GR. A preselected diffracted wavelength beam is reflected by mirror M2 back to grating GR where it is directed back across the laser material LM for amplification. The beam propagating from laser material LM is then directed to reflector MC1 which reflects the defracted wavelength beam from LM to output coupler M1 which is reflective of a majority of the beam and transmits a portion of the beam outside the laser cavity. optionally, the laser of FIG. 5 could also include second or third harmonic generator as described in relation to FIG. 4.

Figure 6:
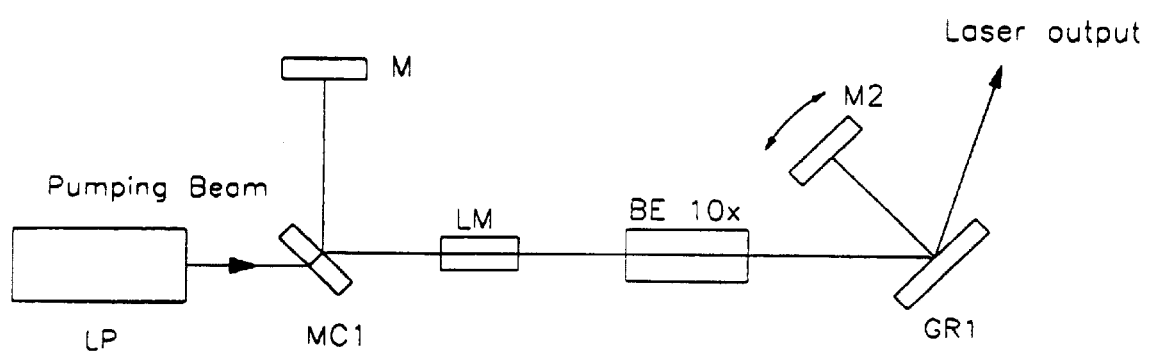
FIG. 6 is a diagrammatic view of an alternative embodiment of the laser according to the invention.

FIG. 6 shows an alternative embodiment of the invention. The embodiment in FIG. 6 is similar to FIG. 5 except that the laser output is directed outside the cavity by grating GR1. In this embodiment the beam generated by LM is expanded in beam expander BE. The expanded beam incidents on grating GR. The beam is then defracted and the first order defracted beam for the preselected wavelength is directed to mirror M2. Desirably the zero order diffracted beam for the preselected wavelength is directed outside the laser cavity by the grating as the output of the laser. Mirror M2 reflects the preselected diffracted beam back along the optical axis to grating GR1 where it is reflected along the optical axis to LM for further amplification. Mirror M11 is reflective for the diffracted beam and reflects the beam back to mirror MC1 where it is reflected along the optical axis to LM for further amplification.

EXAMPLES

Nd:YLF second harmonic pumped Ti:Sapphire laser were constructed having 3.3x, 11x and 36x beam expanders. The devices were pumped at a variety of repetition rates and pump power. The conversion efficiency for the various configurations is report in Table 1.

TABLE 1

|  | EX1 | EX2 | EX3 | EX4 | EX5 | EX6 |
| --- | --- | --- | --- | --- | --- | --- |
| Beam Expansion | 3.3 x | 3.3 x | 11 x | 11 x | 36 x | 36 x |
| Repetition rate | 10 pps | 1000 pps | 10 pps | 10000 pps | 10 pps | 10000 pps |
| Pumping energy | 10 mj | 10 mj | 10 mj | 10 mj | 10 mj | 10 mj |
| Pump power | .1 w | 10 w | .1 w | 10 w | .1 w | 10 w |
| Pumping wavelength | 527 nm | 527 nm | 527 nm | 527 nm | 527 mn | 527 nm |
| Output pulse energy | 2.0 mj | 0.4 mj | 1.9 mj | 1.4 mj | 1.6 mj | 1.5 mj |
| Output average power | 20 mW | 400 mW | 19 mW | 1.4 W | 16 mW | 1.5 W |
| Transverse mode | TEM00 | Multi-mode | TEM00 | Apprx. TEM00 | TEM00 | TEM00 |
| Conversion efficiency | 20% | 4% | 19% | 14% | 16% | 15% |

TABLE 2

|  | EX7 | EX8 | EX9 | EX10 | EX11 | EX12 |
| --- | --- | --- | --- | --- | --- | --- |
| Beam Expansion | 3.3 x | 3.3 x | 11 x | 11 x | 36 x | 36 x |
| Repetition rate | 10 pps | 1000 pps | 10 pps | 10000 pps | 10 ppg | 10000 pps |
| Pumping energy | 1 mj | 1 mj | 1 mj | 1 mj | 1 mj | 1 mj |
| Pump power | 0.01 w | 1.0 w | .01 w | 1.0 w | .01 w | 1.0 w |
| Pumping wavelength | 527 nm | 527 nm | 527 nm | 527 nm | 527 nm | 527 nm |
| Output pulse energy | 180 µj | 175 µj | 170 µj | 170 µj | 165 µj | 165 µj |
| Output average power | 1.8 mW | 175 mW | 1.7 mW | 170 mW | 1.6 mW | 165 mW |
| Transverse mode | TEM00 | TEM00 | TEM00 | TEM00 | TEM00 | TEM00 |
| Conversion efficiency | 18% | 17.5% | 17% | 17% | 16.5% | 16.5% |

TABLE 3

|  | EX13 | EX14 | EX15 |
| --- | --- | --- | --- |
| Beam Expansion | 3.3 X | 11 X | 36 X |
| Repetition rate | 10000 pps | 10000 pps | 100000 pps |
| Pumping energy | 1 mj | 1 mj | 1 mj |
| Pump power | 10 w | 10 w | 10 w |
| Pumping wavelength | 527 nm | 527 nm | 527 nm |

TABLE 3-continued

|  | EX13 | EX14 | EX15 |
|---|---|---|---|
| Output pulse energy | 30 μj | 145 μj | 150 μj |
| Output average power | 300 mW | 1.45 W | 1.5 W |
| Transverse mode | Multimode | Apprx. TEM00 | TEM00 |
| Conversion efficiency | 3% | 14.5% | 15% |

TABLE 4

|  | EX16 | EX17 | EX18 | EX19 | EX20 | EX21 |
|---|---|---|---|---|---|---|
| Beam Expansion | 3.3 x | 3.3 x | 11 x | 11 x | 36 x | 36 x |
| Repetition rate | 10 pps | 1000 pps | 10 pps | 10000 pps | 10 pps | 1000 pps |
| Pumping energy | 20 mj | 20 mj | 20 mj | 20 mj | 20 mj | 20 mj |
| Pump power | 0.2 w | 20 w | 0.2 w | 20 w | 0.2 w | 20 w |
| Pumping wavelength | 527 nm | 527 nm | 527 nm | 527 nm | 527 nm | 527 nm |
| Output pulse energy | 3.6 mj | unstable | 3.5 mj | 2.0 mj | 1.7 mj | 1.6 mj |
| Output average power | 36 mW | unstable | 35 mW | 2 W | 34 mW | 3.2 W |
| Transverse mode | TEM00 | Multi-mode | TEM00 | Muiti-mode | TEM00 | TEM00 |
| Conversion efficiency | 18% | 0% | 17.5% | 10% | 17% | 16% |

DISCUSSION OF TABLES

The examples compare the conversion efficiency at various pumping energy, pump power values, repetition rate and beam expanders.

In Example 1 a laser of the prior art having a 3.3x expander, a repetition rate of 10 pps and a pump power of 0.1W was tested. A conversion efficiency of 20% is achieved. In example 3, a 11x beam expander was used. A conversion efficiency of 19% was achieved. Thus, at 10 pps no significant improvement in conversion efficiency was achieved when a 11x beam expander was substituted for a 3.3x beam expander at a low pump power of 0.1W.

In Example 2 a laser with a 3.3x beam expander was operated at a repetition rate of 1000 pps and a high pump power of 10W. A very drastic drop in conversion efficiency to 4% compared to the 20% achieved in Example 1 at 10 pps at 0.1 w pump power was observed.

Example 4 shows a laser according to the invention. A 11x beam expander was operated at 1000 pps and a pump power of 10 watts. A conversion efficiency of 14% was achieved. Example 6 shows a 36x beam expander operated at 1000 pps and 10 watts pump power. A conversion efficiency of 15% was achieved. Thus a three (3) times improvement over Example 2 was achieved.

In Example 13 a laser with a 3.3x beam expander was operated at 10,000 pps and 10 watts of pump power. A 3% efficiency was achieved. In examples 14 and 15, lasers according to the invention with a 11x and 36x beam expander respectively were operated at 10000 pps. A 14.5% and 15% conversion efficiency was found. This is more than a three fold improvement over the 3x beam expander of Example 13.

Table 2, Ex 7 to Ex 12 shows that at low power, the use of a larger beam expander does not result in improved conversion efficiency.

Table 4 shows that at a pump power of 20 w and 1000 pps an improved conversion efficiency is achieved with an 11x and 36x beam expander over a 3.3x beam expander.

The foregoing is considered as illustrative only to the principles of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

What is claimed is:

1. A method of providing a laser pulse at a high repetition rate comprising:
   a) locating a diffraction grating within a laser cavity;
   b) exciting a solid state laser material located within said cavity by pulsing a pump laser at a pulsing rate of about 700 pulses per second (PPS) or higher at a pump power of at least about 4 watts and directing the output of said pump laser across said lasing material to produce a pulsed beam of electromagnetic radiation having a preselected cross sectional area;
   c) said solid state laser material lasing over a range of tunable wave lengths;
   d) expanding the cross sectional area of said pulsed beam of electromagnetic radiation propagating from said lasing material at least 6 times;
   e) directing the expanded pulsed beam on said diffraction grating so that the pulsed beam is diffracted into a plurality of narrow band width beams of differing wave length;
   f) said laser cavity formed between a first mirror and a second mirror or between a first mirror and said grating;
   g) moving either said second mirror or said grating to select one of said narrow band width beams diffracted by said grating said selected beam having a wave length within said range of tunable wave lengths to direct said selected narrow band width beam back across said laser material to amplify said selected beam;
   h) removing at least a portion of said selected beam from said cavity.

2. The method according to claim 1 wherein the pulsed beam is expanded from about 6 to about 60 times.

3. The method according to claim 1 wherein the pulsed bead is expanded at least about 10 times.

4. The method according to claim 1 wherein the pulsed beam is expanded from about 10 times to about 40 times.

5. The method of according to claim 1 or 4 wherein the laser is pumped at a pump power of about 4 to about 25 watts.

6. The method according to claim 1 or 4 wherein the laser is pumped at a pump power of about 7 to about 15 watts.

7. The method according to claim 1 or 4 wherein the laser is pumped at a pump power of at least about 10 watts.

8. The method according to claim 1 wherein said pulsing rate is about 1000 pps or higher.

9. The method according to claim 1 wherein the pulsing rate is 1000 pps to 10,000 pps.

10. The method according to claim 1 where the pulsing rate is 1000 pps.

11. The method according to claim 10 wherein the pulsed beam is expanded from about 10 to about 60 times.

12. The method according to claim 1 wherein said pulsed beam is expanded about 10 times.

13. The method according to claim 1 wherein said laser material is Ti:Sapphire.

14. The method according to claim 1 wherein said laser material is Cr:LiSAF.

15. The method according to claim 1 further comprising directing said amplified defracted beam through a second harmonic generator to form a second harmonic beam.

16. The method according to claim 15 wherein said second harmonic generator is located in the optical cavity.

17. The method according to claim 16 wherein said amplified detracted beam makes a first and second pass through said second harmonic generator.

18. The method according to claim 17 further comprising directing said amplified diffracted beam and said second harmonic beam through a third harmonic generator to form a third harmonic beam.

19. The method of claim 1 wherein said laser cavity is formed between said first mirror and said second mirror.

20. The method of claim 1 wherein said laser cavity is formed between said first mirror and said diffraction grating.

21. A method of claim 1 or wherein said pump laser delivers from about 0.5 mj to about 25 mj of energy to said solid state material.

22. A method of claim 21 wherein said pulsing rate is about 1000 pps or higher.

23. A method of claim 21 wherein the laser material is Ti:Sapphire or Cr:LiSAF.

24. A method of claim 1 or 4 wherein said pump laser delivers 1 to 15 mj of energy to said solid state material.

25. A method of claim 24 wherein said pulsing rate is about 1000 pps or higher.

26. A method of claim 25 wherein the laser material is Ti:Sapphire of Cr:LiSAF.

27. A high repetition solid state pulsed laser comprising:
a) a laser cavity;
b) a diffraction grating located within said laser cavity;
c) laser material having a tunable lasing wavelength range located within said cavity; said cavity formed between a first mirror and a second mirror or between a first mirror and said grating;
d) a pulsed pump laser operated at a pulsing rate of about 700 pulses per second or higher and a pump power of at least about 4 watts;
e) means to direct the output of said pulsed pump laser across said laser material to excite the laser material to emit a broad band electromagnetic radiation having a preselected cross sectional area;
f) a beam expander for expanding the cross sectional area of electromagnetic radiation propagating from said laser material at least about 6 times; said beam expander in optical communication with said diffraction grating;
g) said diffraction grating diffracting the electromagnetic radiation propagating from said beam expander into a plurality of beams having preselected wave lengths and narrow band width;
h) said second mirror or said grating or both being movably mounted to selectively direct one of said beams having a selected wavelength diffracted by said grating, said beam having a wave length within said range of tunable wave lengths, back across said laser material to amplify said selected wavelength beam;
i) an output coupler to direct at least a portion of said selected wavelength beam from the laser cavity.

28. The laser according to claim 27 wherein the beam expander expands the electromagnetic radiation from about 6 times to about 60 times.

29. The laser according to claim 27 wherein the beam expander expands the electromagnetic radiation at least about 10 times.

30. The laser according to claim 27 wherein the beam expander expands the electromagnetic radiation from about 10 times to about 30 times.

31. The laser according to claim 27 or 30 wherein the laser is pumped at a pump power of about 4 to about 25 watts.

32. The laser according to claim 27 or 30 wherein the laser is pumped at a pump power of about 7 watts to about 15 watts.

33. The laser according to claims 27 or 30 wherein the laser is pumped at a pump power of at least about 10 watts.

34. The laser according to claim 27 wherein said pulsing rate is about 1000 pps or higher.

35. The laser according to claim 34 wherein the pulsing rate is about 1000 pps to about 10,000 pps.

36. The laser according to claim 34 where the pulsing rate is about 1000 pps.

37. The laser according to claim 34 wherein the beam expander expands the electromagnetic radiation from about 10 to about 40 times.

38. The laser according to claim 34 wherein said beam expander expands the electromagnetic radiation 10 times.

39. The laser according to claim 28 wherein the beam expander is a prism which expands the cross sectional area of the electromagnetic radiation in one preselected direction.

40. The apparatus according to claim 34 wherein said laser material is Ti:Sapphire.

41. The apparatus according to claim 34 wherein said laser material is Cr:LiSAF.

42. The apparatus according to claim 27 further comprising a second harmonic generator located within said optical cavity; means to direct the pulsed fundamental beam on a first pass across said second harmonic generator; said output coupler transmitting second beam and reflecting said pulsed fundamental beam.

43. The apparatus according to claim 42 further comprising means to direct said pulsed fundamental wavelength beam on a first and second pass through said second harmonic generator.

44. The apparatus according to claim 43 further comprising means to direct said pulsed fundamental beam and said second harmonic beam across a third harmonic generator to form a third harmonic beam.

45. A high repetition pulsed laser according to claim 27 wherein said grating is movably mounted within said cavity so the wavelength of the diffracted beam directed across said laser material can be changed.

46. A high repetition pulsed laser according to claim 27 wherein said laser cavity is formed by a first and second reflective mirror; said mirror in optical communication with said grating.

47. A high repetition pulsed laser according to claim 46 wherein said second reflective mirror is movably mounted within said cavity so that the wavelength of the diffracted beam directed across said laser material can be changed.

48. A high repetition pulsed laser according to claim 27 or 30 wherein said pump laser delivers 0.5 mj to 25 mj to said solid state material.

49. A high repetition pulsed laser according to claim 48 wherein said pulsing rate is at least about 1000 pps.

50. The high repetition pulsed laser according to claim 49 wherein said pulsing rate is at least about 1000 pps.

51. The high repetition pulsed laser of claim 50 wherein the laser material is Ti:Sapphire or Cr:LiSAF.

52. A high repetition pulsed laser according to claim 27 wherein the laser material is Ti:Sapphire or Cr:LiSAF.

53. The high repetition pulsed laser according to claim 27 or 37 wherein said pump laser delivers 1 to 15 jm to said solid state material.

\* \* \* \* \*